United States Patent [19]
Del Rosso

[11] 4,453,575
[45] Jun. 12, 1984

[54] CONTAINER FILLING SYSTEM

[75] Inventor: Victor Del Rosso, Ithaca, N.Y.

[73] Assignee: Hi-Speed Checkweigher Co., Inc., Ithaca, N.Y.

[21] Appl. No.: 346,266

[22] Filed: Feb. 5, 1982

[51] Int. Cl.³ .............................................. G01G 13/06
[52] U.S. Cl. ...................................... 141/83; 177/122; 221/259
[58] Field of Search ............. 53/55, 56, 58, 237, 53/238, 239, 502; 141/1, 10, 83, 128, 153, 156, 157, 159, 163, 186, 187; 177/53, 121, 122; 221/277, 259; 222/56

[56] References Cited

U.S. PATENT DOCUMENTS

| | | | |
|---|---|---|---|
| 2,638,248 | 5/1953 | Alvord | 222/56 |
| 2,950,894 | 8/1960 | Hillman | 177/121 |
| 3,008,607 | 11/1961 | Troll | 221/167 |
| 3,252,630 | 5/1966 | Berg | 141/128 X |
| 3,392,881 | 7/1968 | Eriksen | 221/277 X |
| 3,540,538 | 11/1970 | Connors et al. | 177/122 |
| 3,720,039 | 3/1973 | Warkentin | 53/250 X |
| 4,275,775 | 6/1981 | Egli | 141/83 |
| 4,385,686 | 5/1983 | Gustafsson | 221/259 X |

FOREIGN PATENT DOCUMENTS

| | | | |
|---|---|---|---|
| 927199 | of 1955 | Fed. Rep. of Germany | 141/128 |
| 253231 | of 1930 | Italy | 221/277 |

Primary Examiner—Stephen Marcus
Assistant Examiner—Mark Thronson
Attorney, Agent, or Firm—Bean, Kauffman & Bean

[57] ABSTRACT

There is herein disclosed an improved system for rapidly filling containers precisely to prescribed load weights with articles of the so-called pellet/pill/tablet type; employing in combination, a high speed bulk-loading means and supplementary loading means operable to "polish off" the finalizing loading operation. Incidental thereto, the supplementary loading means is operated to contribute to the bulk-loading operation.

4 Claims, 4 Drawing Figures

CONTAINER FILLING SYSTEM

BACKGROUND OF THE INVENTION

This invention relates to apparatus for filling containers with prescribed weights of discreet articles such as are of columnar form and of the so-called "pellet" type. The invention is concerned with increasing the speed of filling a succession of containers moving successively under a pellet supply source; as well as improving the precision of the loadings to the prescribed weights. The invention provides an improved technique useful in systems for initially bulk-loading at high speed each container up to just less than the prescribed content weight; then fill-finishing the container at diminishing speeds; and then finally cutting off the operation at precisely the prescribed container content weight. Prior systems for such purposes are disclosed for example in known-to-applicant prior U.S. Pat. Nos. 3,008,607 and 3,720,039.

SUMMARY OF THE INVENTION

The present invention provides for transportation, in conjunction with a "bulk-feeding" mechanism, means for feeding a succession of such pellets in improved sequences and in longitudinally end-to-end relation as a supplement to the bulk-feeding operation such as may be supplied from a bin or hopper or the like. The longitudinally aligned "supplementing" pellets travel through one or more slide chutes or conduits; a side wall portion(s) thereof being cut away to provide an open window into which projects a resiliently/frictionally surfaced feed wheel which is arranged to be driven by a compressed air (or electric) powered motor. The wheel frictionally engages one pellet at a time as it passes through its conduit, thus functioning both to drive the train of supplementing feed pellets towards the container, and also operates to monitor or "gate" and ultimately stop the exitings thereof from the conduit. Operation regulating controls of the driving motors of the system are by means of a weight sensing device which vertically supports the container in its alternately empty and filled conditions at the container feed station; and a controller device is provided in conjunction therewith which is manually or automatically adjustable to regulate operations of the driving motors of the system in accordance with any of a variety of optionally available programs.

The bulk feed supplementing system of the present invention may be arranged so as to operate by way of only a single pellet feed conduit, such as by initially running the feed wheel thereof at high speed when called upon until the prescribed weight loading of the container has been almost reached; thereupon decelerating the wheel speed for a relatively shorter time interval; and then finally stopping the wheel when such prescribed weight loading is attained. However, a combination of two or more of such supplementing feed conduit/wheel units may be employed in such manner as to operate in conjunction either with or independently of one another; each such unit receiving its own supply of pellets from a suitable supply source. The controls of such supplementary feed wheels may also be arranged so that all of the feeders initially operate at high speeds during the "bulk" loading phase of the container loading process, and are then selectively and sequentially slowed down, before being finally stopped. Thus, the container loading operations may in any case be performed with improved precision and within shortened time spans.

SPECIFICATION OF PREFERRED EMBODIMENTS

Figure 1:
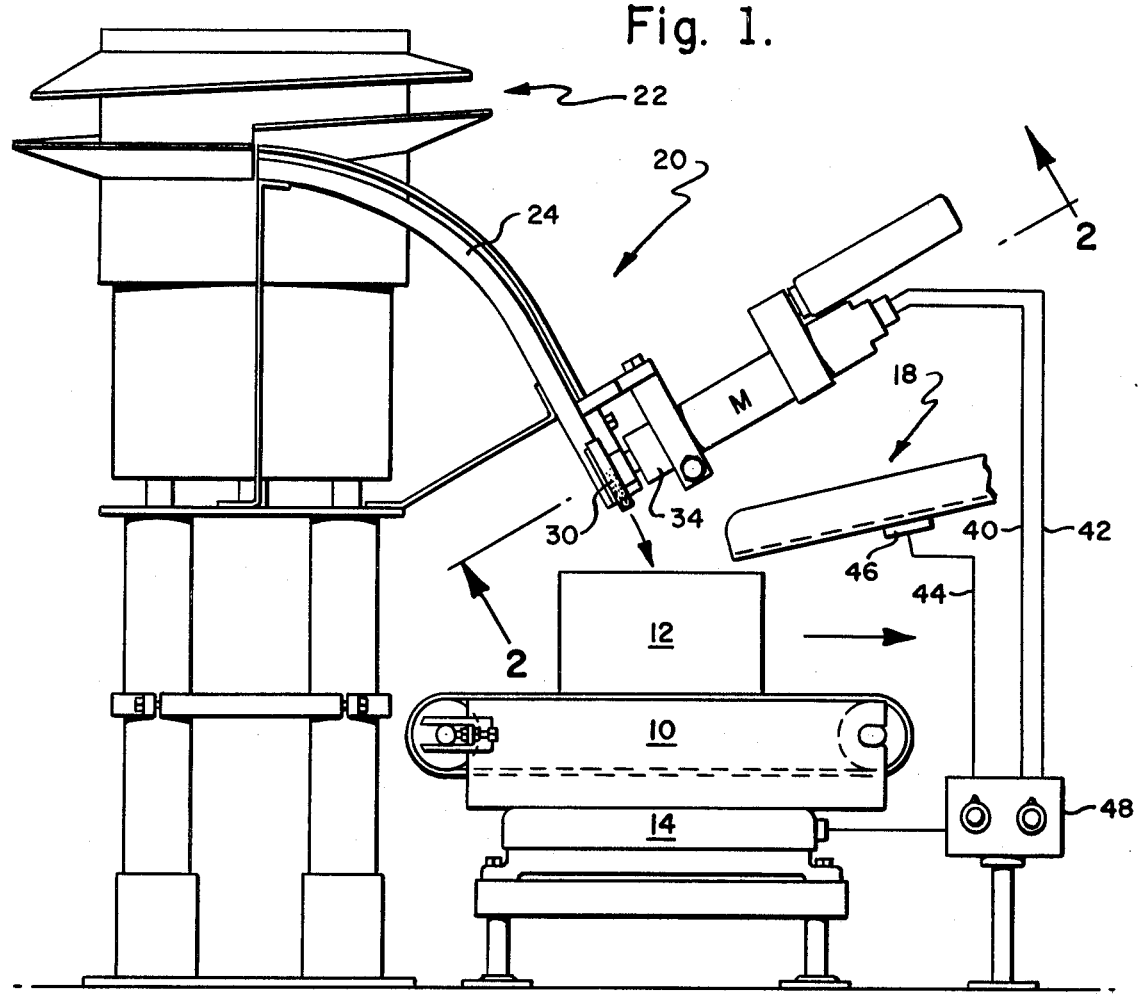
FIG. 1 of the drawing herewith illustrates in side elevational view and in combination with a typical container loading system one example of a container loading system of the present invention employing a pair of supplementary pellet feed conduit units as provided for in accordance with the invention.

As illustrated by the drawing at FIG. 1, a preferred form of the invention may be provided in association with a continuous container weighing and conveying system as is designated generally at 10, upon which containers such as are indicated at 12 are received and carried in succession across the weighing component 14 of the unit by means of a conveyor belt 16. Thus, the open top empty containers are in succession received by and carried by the conveyor, and then are stopped at the pellet loading station, at which time the gross weights including that of the container and contents thereof are vertically supported upon and detected by the weighing device 14 of the system.

A typical bulk-loading random feed device for such systems (such as a vibrating pan feeder or the like as is illustrated at 18) is shown as being situated above the position of the temporarily halted container 12; operation of the bulk feeder 18 being controlled by mechanism to be more fully described hereinafter. In addition thereto, a supplementary feed mechanism of the present invention is provided, such as is shown by way of example generally at 20. The supplementary feed mechanism 20 is in turn supplied by any appropriate hopper or the like such as by example a rotary pellet-aligning and continously discharging "feeder" as is illustrated generally at 22.

Figure 2:
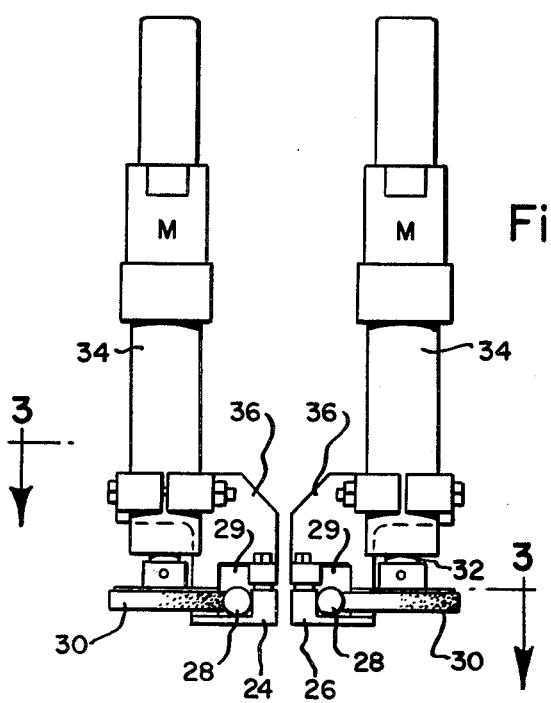
FIG. 2 is a bottom plan view of the feeder conduit arrangement of FIG. 1 as indicated by lines 2—2 of FIG. 1.
Figure 3:
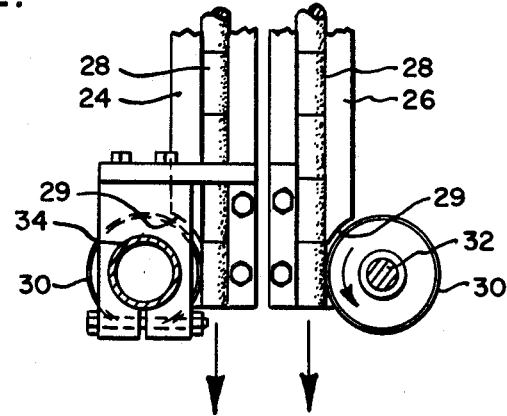
FIG. 3 is a fragmentary sectional view taken as along lines 3—3 of FIG. 2.

As shown by way of further example at FIGS. 1-3, a pair of side-by-side supplementary pellet feed chutes 24,26, each of continuous form and substantially U-shaped section, are arranged each to discharge in succession a controlled supply of longitudinally aligned pellets into the containers 12 as they are received at the loading station. Whereas FIG. 1 may suggest that only one supplementary pellet supply chute may be provided, it is to be understood that any number of such supplementary supply chutes may be employed. Thus, by way of example, FIGS. 2 and 3 show how a pair of chutes 24,26 may be provided. The pellets being dispensated during the container loading operations are designated by the numeral 28.

As best shown at FIGS. 2 and 3, feed chutes 24,26 of the present invention are formed with open windows 29,29 extending through their outer side wall portions, into which project resiliently and frictionally-surfaced feed control wheels 30,31 which are mounted on spindles 32,32 which in turn are rotatably carried within bearing housings 34,34. The housings 34,34 also enclose compressed air (or electrically) powered motors for driving the feed wheels 30,31. The motor carrying housings 34,34 are typically shown as being supported by brackets such as shown at 36,36 relative to the chutes 24,26. The peripheries of the feed wheels 30,31 are thereby mounted to rotate in frictional engagements with the pellets 28 as they travel through the chutes.

Operations of the motors which separately drive the feed wheels 30,31 are controlled by any suitable power supply conductor means such as are shown diagrammatically at 40,42, and which in turn are controlled by the weight sensing device 14 of the container conveying unit. Operations of the bulk-feeding pan 18 are similarly provided for such as by a power conductor means 44 interconnecting the weight sensor and the motor 46 driving the pan 18 operating under command of a manually adjustable controller means such as is shown at 48 which receives weight signals from the sensor 14. Thus, in response to varying weights on the sensor 14, the operations of the bulk and supplementary pellet feeders and of the conveyor are monitored in accordance with the settings of the controller 48. Inasmuch as suitable control means for such purposes are well-known in the art, and in the interest of simplifying this specification, no further specific examples of suitable control arrangements are shown. However, it is a feature of the present invention that the motors driving the bulk feeder and the feed wheels of the supplemental feeders may thus be optionally arranged to operate either singly, or in combination in accord with various programmings thereof as explained hereinabove.

For example, the bulk-feeding pan 18 will typically be operated so as to initially rapidly supply pellets to the container 12 up to just below the prescribed weight loading thereof. At the same time either one or both of the feed wheels 30,31 may also be driven to contribute to the bulk-feeding operation. The bulk feeder is then stopped and the supplementary feed wheels may either be simultaneously or in succession slowed down, and then finally stopped. Alternatively, when the bulk-feeding operation is stopped, either one of the supplementary feed wheels may first be slowed down and then stopped, while the other wheel continues to operate at declining speed and is later finally stopped. In any case, it will be apparent that the supplementary feed wheels have precise control over delivery of pellets for the "topping off" operations and that the system of the invention thereby provides for both improved rapidity and accuracies of the container loading operations.

Figure 4:
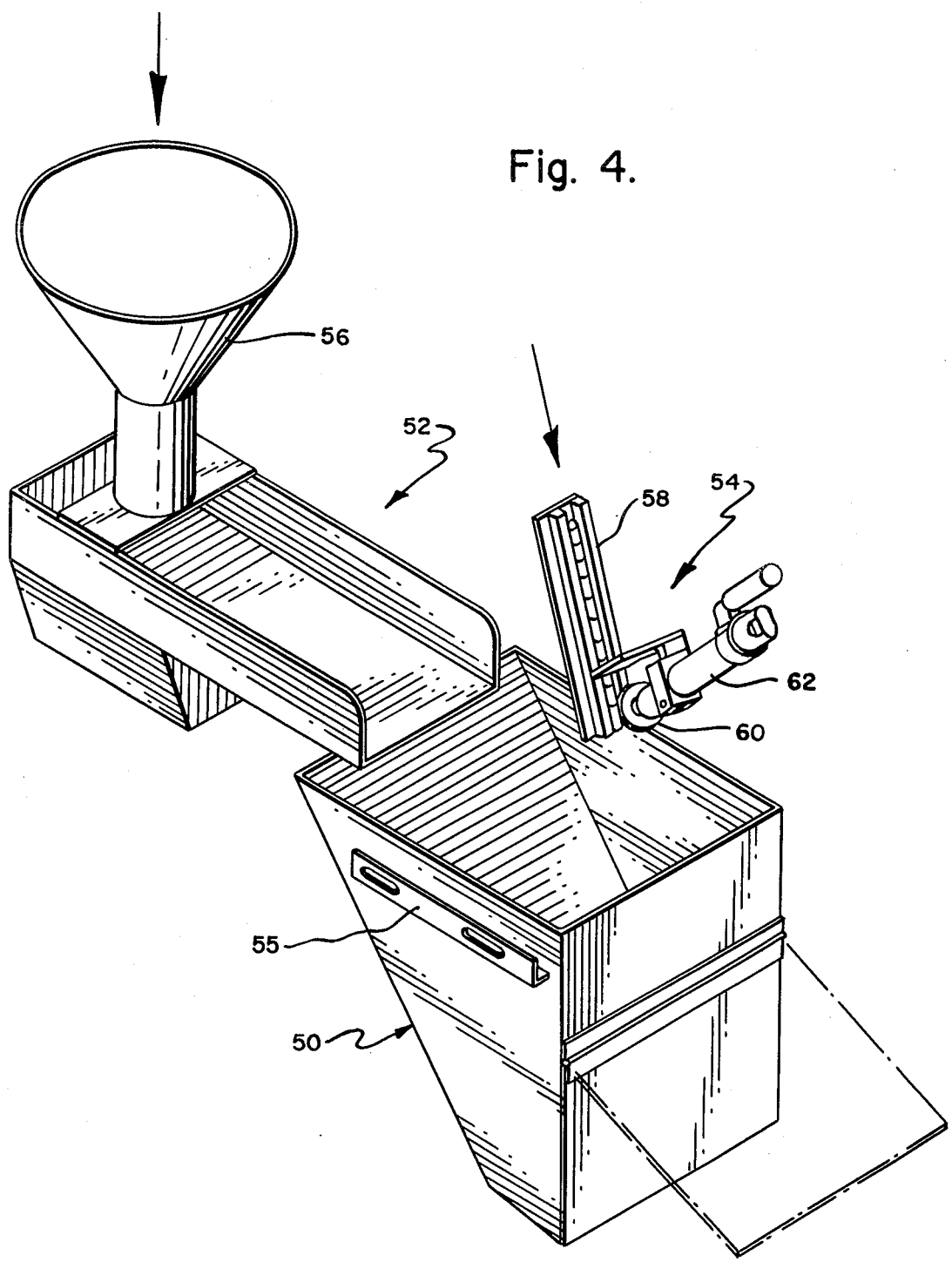
FIG. 4 illustrates in perspective, employment of the invention in conjunction with another typical container bulk-feeding operation.

FIG. 4 illustrates the invention as being employed in another typical weight controlling container loading system. In this case, a hopper as shown at 50 is arranged to receive supply pellets as they are delivered such as from a bulk feeder 52 of the vibrating pan type, and also from a topping-off feeder 54 of the present invention. The pan 52 is shown as being supplied from a hopper 56; and as explained hereinabove, the supplementary feeder 54 may be supplied by any other such suitable device. The load receiving hopper 50 is arranged to be carried upon a weighing scale such as by bracket means as shown at 55; the weight sensing device thereof as being explained hereinabove being arranged to control operations of the feeders 52 and 54 via a programmable controller device such as is also shown at 48 (FIG. 1). Appropriate weight sensing and motor control devices for such purposes have hereinabove been described and illustrated such as by FIG. 1. As in the case of FIGS. 1-3 the feed device 54 of the supplemental feed device of FIG. 4 comprises a chute 58; a feed wheel 60; and a drive motor 62. Thus, it will be understood that operations of the motors driving the feeders 52 and 54 may be programmed by such a controller; therefore providing an improved loading system in accordance with the invention.

I claim:

1. A system for filling containers with pellets comprising a container weighing and filling station for filling containers one at a time with a prescribed weight loading of pellets and a conveyor for moving empty containers into and loaded containers away from said station, said station including:
   a container weighing means;
   a motor driven bulk pellet feeding means arranged to deliver pellets into a container disposed on said weighing means;
   a plurality of supplementary pellet feeding means arranged to deliver pellets into said container disposed on said weighing means, each of said supplementary pellet feeding means including a chute accommodating a supply of pellets arranged in longitudinal alignment and having a side wall formed with an opening into the interior of said chute and a motor driven pellet feed control wheel having its periphery arranged to project through said opening for frictional engagement with said pellets successively as they pass through said chute; and
   a controller connected to said weighing means for operating said bulk pellet feeding means to supply pellets to said container up to just below said prescribed weight loading and for operating the feed control wheels of said supplementary pellet feeding means for supplying pellets to said container until said prescribed weight loading is achieved, and said controller is adjustable to cause said wheels to operate at varying speeds.

2. A system as set forth in claim 1 wherein said controller is adjustable to cause said wheels to stop in sequence.

3. A system for filling containers with pellets comprising a container weighing and filling station for filling containers one at a time with a prescribed weight loading of pellets and a conveyor for moving empty containers into and loaded containers away from said station, said station including:
   a container weighing means;
   a motor driven bulk pellet feeding means arranged to deliver pellets into a container disposed on said weighing means;
   a plurality of supplementary pellet feeding means arranged to deliver pellets into said container disposed on said weighing means, each of said supplementary pellet feeding means including a chute accommodating a supply of pellets arranged in longitudinal alignment and having a side wall formed with an opening into the interior of said chute and a motor driven pellet feed control wheel having its periphery arranged to project through said opening for frictional engagement with said pellets successively as they pass through said chute; and
   a controller connected to said weighing means for operating said bulk pellet feeding means to supply pellets to said container up to just below said prescribed weight loading and for operating the feed control wheels of said supplementary pellet feeding means for supplying pellets to said container until said prescribed weight loading is achieved, and said controller is adjustable to cause said wheels to stop in sequence.

4. A system for filling containers with pellets comprising a container weighing and filling station for filling containers one at a time with a prescribed weight loading of pellets and a conveyor for moving empty containers into and loaded containers away from said station, said station including:
- a container weighing means;
- a motor driven bulk pellet feeding means arranged to deliver pellets into a container disposed on said weighing means;
- a supplementary pellet feeding means separate from said bulk pellet feeding means and arranged to deliver pellets into said container disposed on said weighing means, said supplementary pellet feeding means including a continuous chute of substantially U-shaped section accommodating a supply of pellets arranged in longitudinal alignment and having a side wall formed with an opening into the interior of said chute and a motor driven pellet feed control wheel having a resiliently surfaced periphery arranged to project through said opening into frictional engagement with said pellets successively as they pass through said chute for alternatively driving said pellets towards said container and stopping exit thereof from said chute; and
- a controller connected to said weighing means for operating said bulk pellet feeding means to supply pellets to said container up to just below said prescribed weight loading and for operating said feed control wheel of said supplementary pellet feeding means for supplying pellets to said container during operation of said bulk pellet feeding means and thereafter until said prescribed weight loading is achieved.

* * * * *